United States Patent
Votaw et al.

(10) Patent No.: US 10,437,984 B2
(45) Date of Patent: Oct. 8, 2019

(54) AUTHENTICATION PROTOCOL ELEVATION TRIGGERING SYSTEM

(71) Applicant: BANK OF AMERICA CORPORATION, Charlotte, NC (US)

(72) Inventors: Elizabeth S. Votaw, Potomac, MD (US); Manu Jacob Kurian, Dallas, TX (US); Morgan Stewart Allen, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 167 days.

(21) Appl. No.: 15/794,964

(22) Filed: Oct. 26, 2017

(65) Prior Publication Data

US 2019/0130094 A1    May 2, 2019

(51) Int. Cl.
- *G06F 21/44* (2013.01)
- *H04L 29/06* (2006.01)
- *G05B 15/02* (2006.01)

(52) U.S. Cl.
CPC ............ *G06F 21/44* (2013.01); *G05B 15/02* (2013.01); *H04L 63/083* (2013.01); *H04L 63/0861* (2013.01); *H04L 63/1408* (2013.01)

(58) Field of Classification Search
CPC ........ G06F 21/44; G05B 15/02; H04L 63/083
See application file for complete search history.

(56) References Cited

U.S. PATENT DOCUMENTS

| | | |
|---|---|---|
| 5,907,709 A | 5/1999 | Cantey et al. |
| 6,826,698 B1 | 11/2004 | Minkin et al. |
| 6,829,585 B1 | 12/2004 | Grewal et al. |
| 7,120,647 B2 | 10/2006 | Venkatesh et al. |
| 7,426,654 B2 | 9/2008 | Adams, Jr. et al. |
| 7,431,202 B1 | 10/2008 | Meador et al. |
| 7,607,066 B2 | 10/2009 | Gertz et al. |
| 7,626,938 B1 | 12/2009 | Orr et al. |
| 7,680,809 B2 | 3/2010 | Deng et al. |
| 7,685,067 B1 | 3/2010 | Britto et al. |
| 7,752,554 B2 | 7/2010 | Biggs et al. |
| 7,861,252 B2 | 12/2010 | Uszok et al. |
| 7,882,394 B2 | 2/2011 | Hosek et al. |
| 7,937,624 B2 | 5/2011 | Qing et al. |
| 7,954,143 B2 | 5/2011 | Aaron |
| 7,966,654 B2 | 6/2011 | Crawford |
| 7,966,655 B2 | 6/2011 | Acharya et al. |

(Continued)

*Primary Examiner* — Chau Le
*Assistant Examiner* — Vance M Little
(74) *Attorney, Agent, or Firm* — Michael A. Springs; Moore & Van Allen PLLC; Nicholas C. Russell

(57) ABSTRACT

Embodiments of the invention are directed to a system, method, or computer program product for authentication protocol elevation triggering based on situational instance. In this regard, the invention provides a dynamic platform for structuring a robotic process automation (RPA) application for determining authentication requirements in real-time by converting a user device into a virtual workstation. The invention configures a robotic process automation application for interacting with a first user interface of the first device application to identify situational events in real time. Another aspect of the invention is directed to escalating, in real-time, a level of authentication required for the user to execute the user activity based on at least the situational event identified by the robotic process automation application.

20 Claims, 8 Drawing Sheets

(56) References Cited

U.S. PATENT DOCUMENTS

| | | | |
|---|---|---|---|
| 7,973,508 B2 | 7/2011 | Le | |
| 8,014,726 B1 * | 9/2011 | Petersen | H04M 15/00 455/67.11 |
| 8,065,719 B2 | 11/2011 | Yang | |
| 8,082,471 B2 | 12/2011 | Khan | |
| 8,099,774 B2 | 1/2012 | Abzarian et al. | |
| 8,171,406 B1 | 5/2012 | Newstadt et al. | |
| 8,285,643 B2 | 10/2012 | Isaacson et al. | |
| 8,285,652 B2 | 10/2012 | Biggs et al. | |
| 8,397,282 B2 | 3/2013 | Turley et al. | |
| 8,407,670 B2 | 3/2013 | Hegde et al. | |
| 8,418,240 B2 | 4/2013 | Wool | |
| 8,448,139 B2 | 5/2013 | Ghosh | |
| 8,508,336 B2 | 8/2013 | Giobbi et al. | |
| 8,515,958 B2 | 8/2013 | Knight | |
| 8,549,643 B1 | 10/2013 | Shou | |
| 8,566,169 B2 | 10/2013 | Bohanan et al. | |
| 8,700,414 B2 | 4/2014 | Rothermel et al. | |
| 8,745,698 B1 | 6/2014 | Ashfield et al. | |
| 8,751,559 B2 | 6/2014 | Richardson et al. | |
| 8,793,578 B2 | 7/2014 | Mounty et al. | |
| 8,819,825 B2 | 8/2014 | Keromytis et al. | |
| 8,849,907 B1 | 9/2014 | Hession et al. | |
| 8,935,673 B1 | 1/2015 | Ashkenazi et al. | |
| 8,955,743 B1 | 2/2015 | Block et al. | |
| 8,976,697 B2 | 3/2015 | Kalkunte | |
| 9,024,993 B2 | 5/2015 | Hession et al. | |
| 9,088,543 B2 | 7/2015 | Lemke et al. | |
| 9,105,143 B1 | 8/2015 | Huggins et al. | |
| 9,112,709 B1 * | 8/2015 | Tofigh | H04L 12/1818 |
| 9,135,615 B1 | 9/2015 | Mutha | |
| 9,183,106 B2 | 11/2015 | Rao et al. | |
| 9,195,739 B2 | 11/2015 | Imig et al. | |
| 9,201,646 B2 | 12/2015 | Balachandran | |
| 9,215,213 B2 | 12/2015 | Bansal et al. | |
| 9,216,509 B2 | 12/2015 | Renkis | |
| 9,280,406 B2 | 3/2016 | Ghosh | |
| 9,311,632 B1 | 4/2016 | Dent | |
| 9,356,942 B1 | 5/2016 | Joffe | |
| 9,356,957 B2 | 5/2016 | Keromytis et al. | |
| 9,378,064 B2 | 6/2016 | Dees, Jr. et al. | |
| 9,383,973 B2 | 7/2016 | Villar et al. | |
| 9,412,073 B2 | 8/2016 | Brandt et al. | |
| 9,451,056 B2 | 9/2016 | Assarpour et al. | |
| 9,471,474 B2 | 10/2016 | Gurumurthy et al. | |
| 9,530,129 B2 | 12/2016 | Lanc | |
| 9,555,544 B2 | 1/2017 | Bataller et al. | |
| 9,600,456 B2 | 3/2017 | Sriganesh et al. | |
| 9,626,721 B2 | 4/2017 | Granbery | |
| 9,632,771 B2 | 4/2017 | Toub | |
| 9,660,959 B2 | 5/2017 | Hsu et al. | |
| 9,665,467 B2 | 5/2017 | Angwin et al. | |
| 9,667,596 B2 | 5/2017 | Halabi | |
| 9,674,222 B1 | 6/2017 | Joffe | |
| 9,686,186 B2 | 6/2017 | Liste et al. | |
| 9,703,624 B2 | 7/2017 | Purushothaman et al. | |
| 9,715,675 B2 | 7/2017 | Chakravarty et al. | |
| 9,723,485 B2 | 8/2017 | Jones-McFadden | |
| 2003/0046583 A1 | 3/2003 | Goldman et al. | |
| 2004/0030931 A1 | 2/2004 | Chamandy et al. | |
| 2006/0048218 A1 | 3/2006 | Lingafelt et al. | |
| 2007/0016945 A1 | 1/2007 | Bassett et al. | |
| 2012/0096557 A1 * | 4/2012 | Britton | G06Q 10/0635 726/25 |
| 2013/0042298 A1 * | 2/2013 | Plaza Fonseca | G06F 21/335 726/1 |
| 2014/0181968 A1 | 6/2014 | Ge et al. | |
| 2014/0208419 A1 * | 7/2014 | Chang | G06F 21/31 726/21 |
| 2016/0048502 A1 | 2/2016 | Montenegro et al. | |
| 2016/0080345 A1 * | 3/2016 | Safruti | H04L 67/02 726/6 |
| 2016/0335016 A1 | 11/2016 | Kurian et al. | |
| 2017/0173784 A1 | 6/2017 | Shah et al. | |
| 2017/0228119 A1 | 8/2017 | Hosbettu et al. | |
| 2017/0269972 A1 | 9/2017 | Hosabettu et al. | |
| 2017/0270431 A1 | 9/2017 | Hosabettu et al. | |
| 2017/0288943 A1 * | 10/2017 | Plumb | H04L 41/046 |

* cited by examiner

AUTHENTICATION PROTOCOL ELEVATION TRIGGERING SYSTEM

FIELD OF THE INVENTION

The present invention is directed to dynamic assessment and variation of authentication requirements for electronic user activities using specific purpose robotic process automation applications configured to operate existing user interfaces. Furthermore, the present invention embraces a novel, proactive approach to safeguarding user information.

BACKGROUND

Over the last few years, there has been a significant increase in the number of electronic activities, particularly online and mobile activities due to widespread use of smartphone, tablet computers, laptop computers and electronic computing devices in general. Therefore, proactively and automatically identifying and preventing unauthorized exposure of users' electronic information, and ensuring the security of electronic activities is crucial. While it may not be feasible to perpetually ascertain the veracity of the multitude of network devices/networks, device locations and applications stored on the devices associated with all electronic activities, the present invention provides a novel method of employing historical data to identify potential exposure and mitigate potential exposure by dynamically escalating authentication requirements, in real-time.

The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a system, method and computer program product for assessing network authentication requirements based on situational instance, a corresponding method, and computer program product. The system provides a dynamic platform for escalating authentication requirements in real-time. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: establish an first operative communication link with a first user device of the plurality of networked devices, wherein the first user device is associated with a user, wherein a first device application is stored on the first user device; configure a first robotic process automation application for interacting with a first user interface of the first device application to identify situational events in real time, wherein configuring comprises structuring the first robotic process automation application to utilize controls of an input device of the first user device to interact with the first user interface of the first device application for converting the first user device into a virtual workstation for the first robotic process automation application; transmit, via the first operative communication link, the first robotic process automation application to the first user device; in response to determining at least (i) that the first user device is not being operated on by the user, and (ii) that the first user device has not been operated on by the user within a preceding predetermined time interval, transmit a first control signal, via the first operative communication link, to the first robotic process automation application, the first control signal being structured to cause the first robotic process automation application to interact with the first user interface of the first device application to identify situational events in real time by utilizing controls of the input device of the first user device; receive, via the first operative communication link, a response signal indicating identification of an occurrence of a situational event from the first robotic process automation application; establish a second operative communication link with a second user device of the plurality of networked devices, wherein the second user device is associated with the user; configure a second robotic process automation application for escalating authentication requirements of a second device application stored on the second user device; transmit, via the second operative communication link, the second robotic process automation application to the second user device; receive, via the second operative communication link, from the second user device, a request to execute a user activity using the second device application, wherein the user activity requires validation of one or more authentication credentials; escalate, in real-time, a level of authentication required for the user to execute the user activity using the second device application based on at least determining that the situational event identified by the first robotic process automation application is associated with an exposure event for the user; transmit a second control signal, via the second operative communication link, to the second robotic process automation application, the second control signal being structured to cause the second robotic process automation application to present the escalated authentication requirement to the user via a user interface of the second device application stored on the second user device; and enable the user to execute the user activity based on receiving a positive authentication response at the second device application of the second user device.

In another embodiment, and in combination with any of the previous embodiments, the situational event identified by the first robotic process automation application comprises at least one of occurrence of a natural disaster, breach of security of an entity, and a predetermined activity trend associated with an exposure event.

In another embodiment, and in combination with any of the previous embodiments, determining that the situational event identified by the first robotic process automation application is associated with the exposure event for the user comprises at least one of (i) determining that a geographical location of the user is within a predetermined distance from a location of the natural disaster, (ii) determining that the user is associated with the entity, and (iii) determining that the user is associated with the predetermined activity trend.

In another embodiment, and in combination with any of the previous embodiments, the situational event identified by the first robotic process automation application comprises a breach of security of an entity. Here, the invention (system, computerized method, and computer program product) may be further configured to: retrieve, via the operative communication link, application information from the first user device and the second user device; determine one or more applications associated with the first user device and/or the second user device, wherein the one or more applications comprise applications stored on the first user device and/or the second user device; and escalate the level of authentication required for the user activity based on at least determining that at least one of the one or more applications is associated with the entity associated with the security breach.

In another embodiment, and in combination with any of the previous embodiments, the second robotic process automation application is further configured to lock a display of the second user device until the positive authentication response is received.

In another embodiment, and in combination with any of the previous embodiments, the invention (system, computerized method, and computer program product) may be further configured to: determine whether current user security features meet the escalated authentication requirement for the user activity; determine one or more types of new security features that meet the escalated authentication requirement; and enable the user to modify the current user security features based on the determined new security features.

In another embodiment, and in combination with any of the previous embodiments, configuring the first robotic process automation application for interacting with the first user interface of the first device application comprises configuring the first robotic process automation application to: identify a first input data portion to be provided at the first user interface of the first device application for identify situational events; identify the input device of a plurality of input devices of the first user device that is associated with the first input data portion; identify an input signal format associated with the input device; transform the first input data portion into the input signal format associated with the input device; and transmit, to the first device application, input device control signals for the first input data in the input signal format.

In another embodiment, and in combination with any of the previous embodiments, the invention (system, computerized method, and computer program product) may be further configured to: transmit, to the second device application, an authentication control signal configured to cause the second device application to present the escalated authentication requirement to the user via the user interface of the second device application.

In another embodiment, and in combination with any of the previous embodiments, the invention (system, computerized method, and computer program product) may be further configured to: identify a display device of a plurality of output devices of the second user device that is associated with presenting the user interface of the second device application; identify an output signal format associated with the display device of the second user device; and transmit, to the display device, display device control signals for presenting the escalated authentication requirement to the user via the user interface of the second device application.

In another embodiment, and in combination with any of the previous embodiments, the invention (system, computerized method, and computer program product) may be further configured to: in response to receiving a positive authentication response at the second device application, identify an auxiliary activity associated with mitigation of the situational event, wherein the second device application is configured to facilitate the performance of the auxiliary activity based on receiving user input; identify an auxiliary activity interface of the second device application associated with receiving the user input for performing the auxiliary activity; transmit, to the second device application, control instructions that are configured to cause the second device application to present the auxiliary user interface on a display device of the second user device; determine an auxiliary user input required for performing the auxiliary user activity; and transmit, to the second device application, the auxiliary user input using controls of an input device associated of the second user device.

In another embodiment, and in combination with any of the previous embodiments, transmitting the auxiliary user input to the second device application using controls of the input device of the second user device further comprises: identifying a graphical input element of the auxiliary user interface that is associated with receiving the auxiliary user input; identifying an input device of a plurality of input devices of the second user device that is associated with the graphical input element; identifying an input signal format associated with the input device; and transmitting, to the second device application, input device control signals for the auxiliary user input in the input signal format, wherein the input device control signals are configured to cause the second device application to pre-fill the auxiliary user input in the graphical input element in a presentation of the auxiliary user interface on the display device of the second user device.

In another embodiment, and in combination with any of the previous embodiments, configuring the first robotic process automation application for interacting with the first user interface of the first device application to identify situational events in real time, further comprises: identifying one or more process steps for interacting with the first user interface of the first device application; presenting a robotic process automation (RPA) configuration application interface to the user, wherein the robotic process automation configuration application interface comprises one or more graphical function elements associated with the one or more process steps; allow the user to configure a process flow, at least in partially, for interacting with the first user interface of the first device application to identify situational events in real time by physically moving, using an input device, each of the one or more graphical function elements from first 2-D location coordinates of the RPA configuration application interface to second 2-D location coordinates of the RPA configuration application interface; receive, for each of the one or more graphical elements, process attributes from the user; construct the first robotic process automation based on the configured process flow and the process attributes received from the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
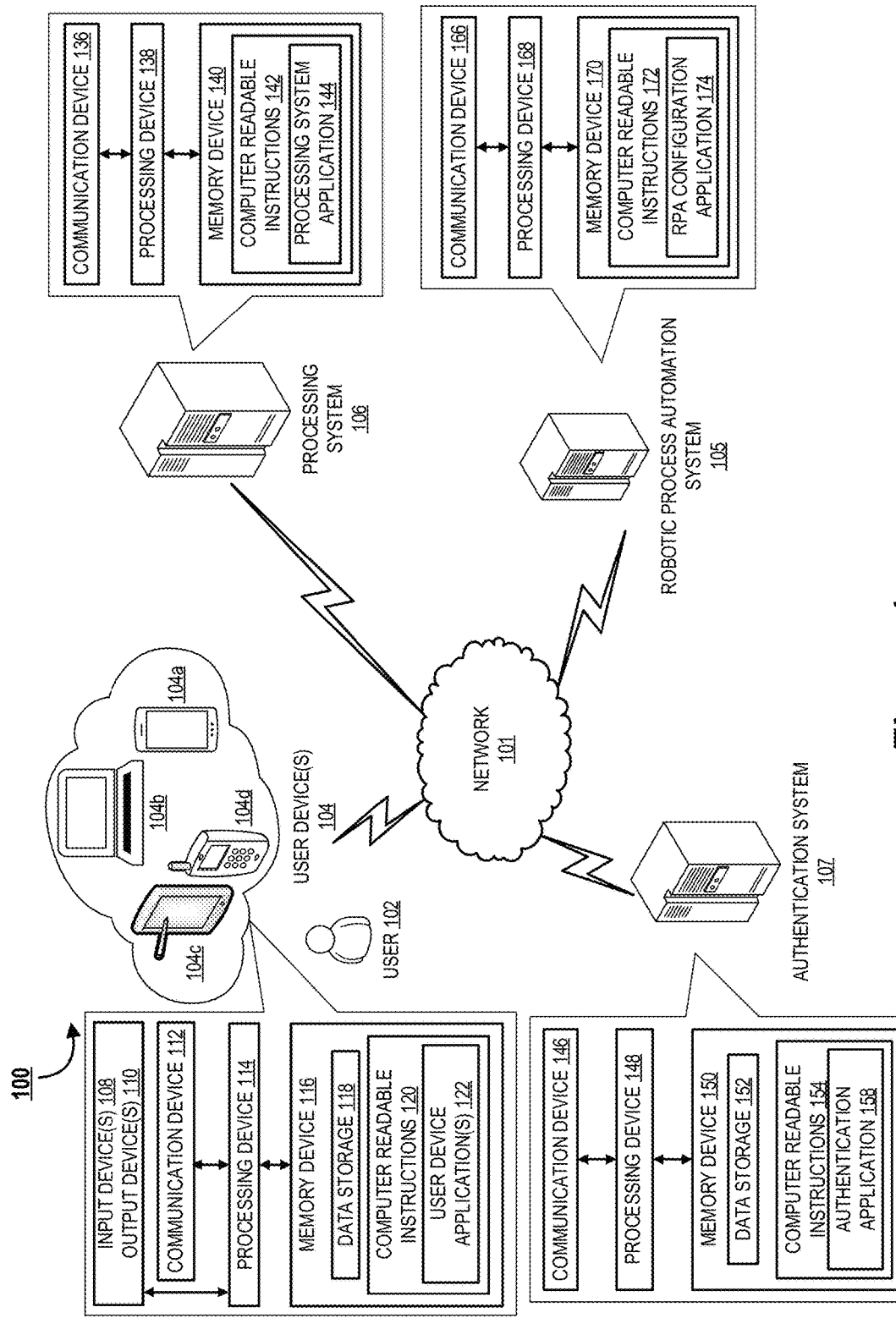
Figure 2:
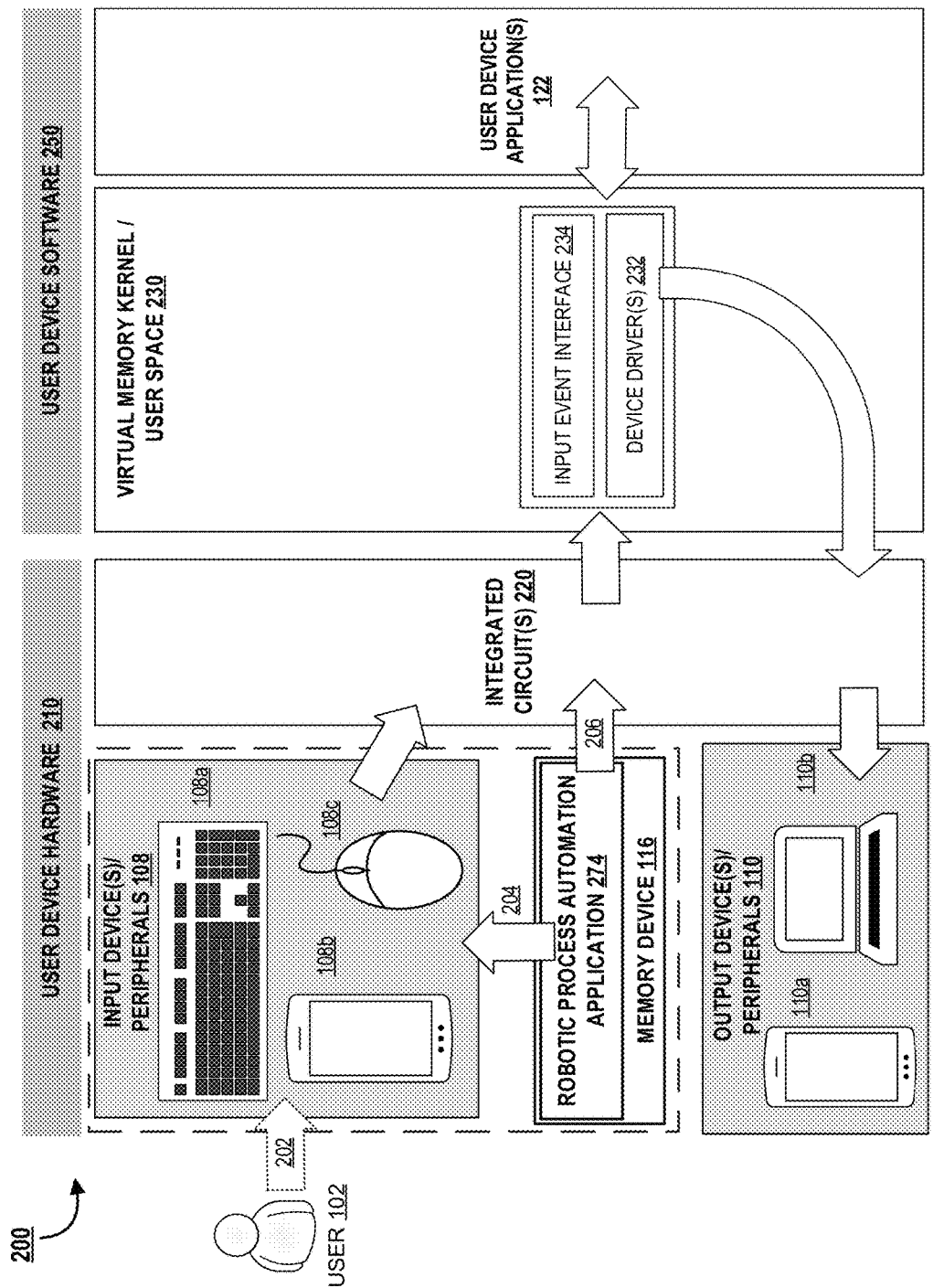

Having thus described embodiments of the invention in general terms, reference will now be made the accompanying drawings, wherein:

FIG. 1 depicts a system environment 100 for authentication protocol elevation triggering based on situational instance, in accordance with an aspect of the present invention;

FIG. 2 depicts a schematic user device and high level process flow for converting the user device into a virtual workstation in accordance with an aspect of the invention.

Figure 3:
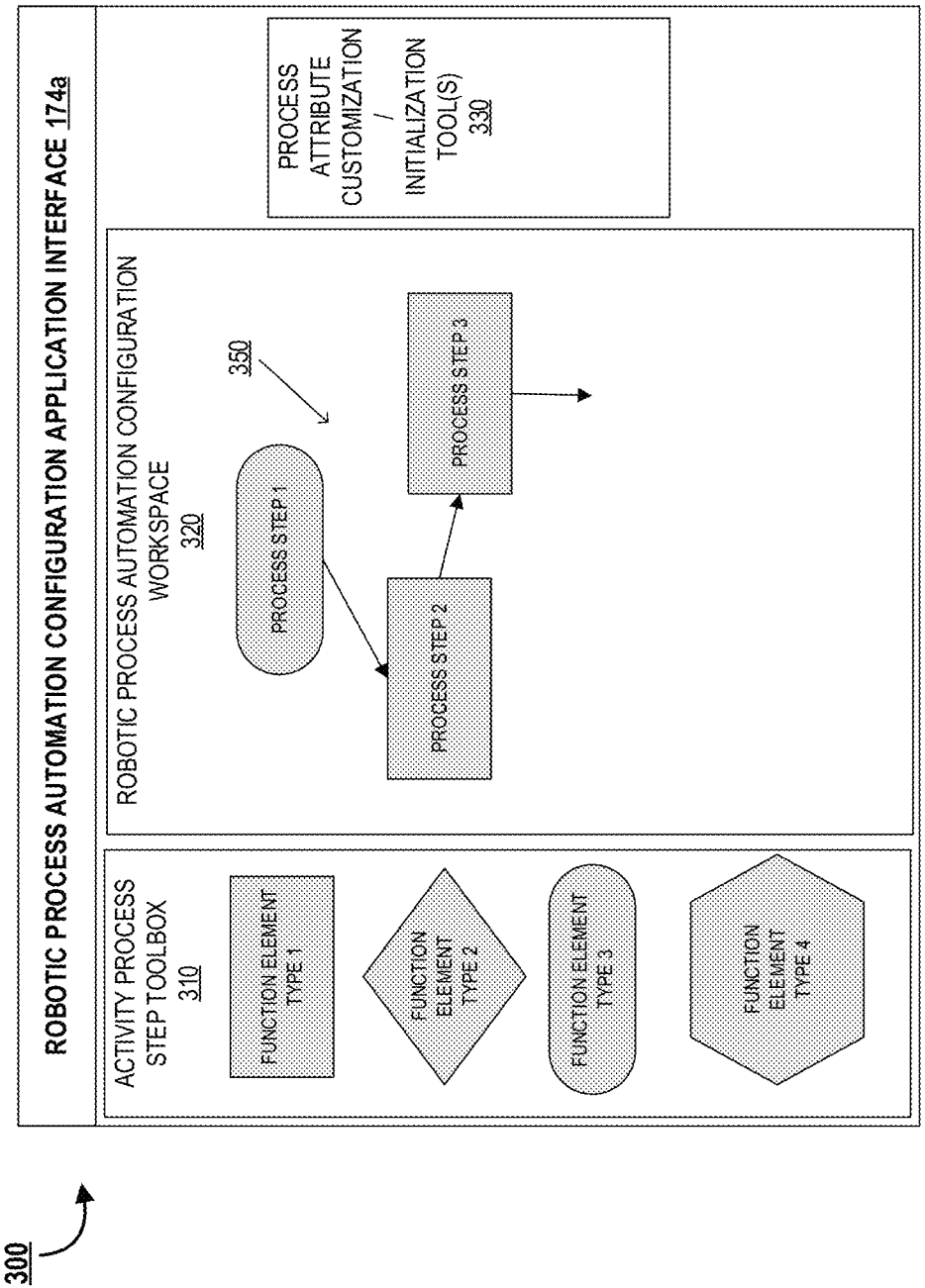
Figure 4:
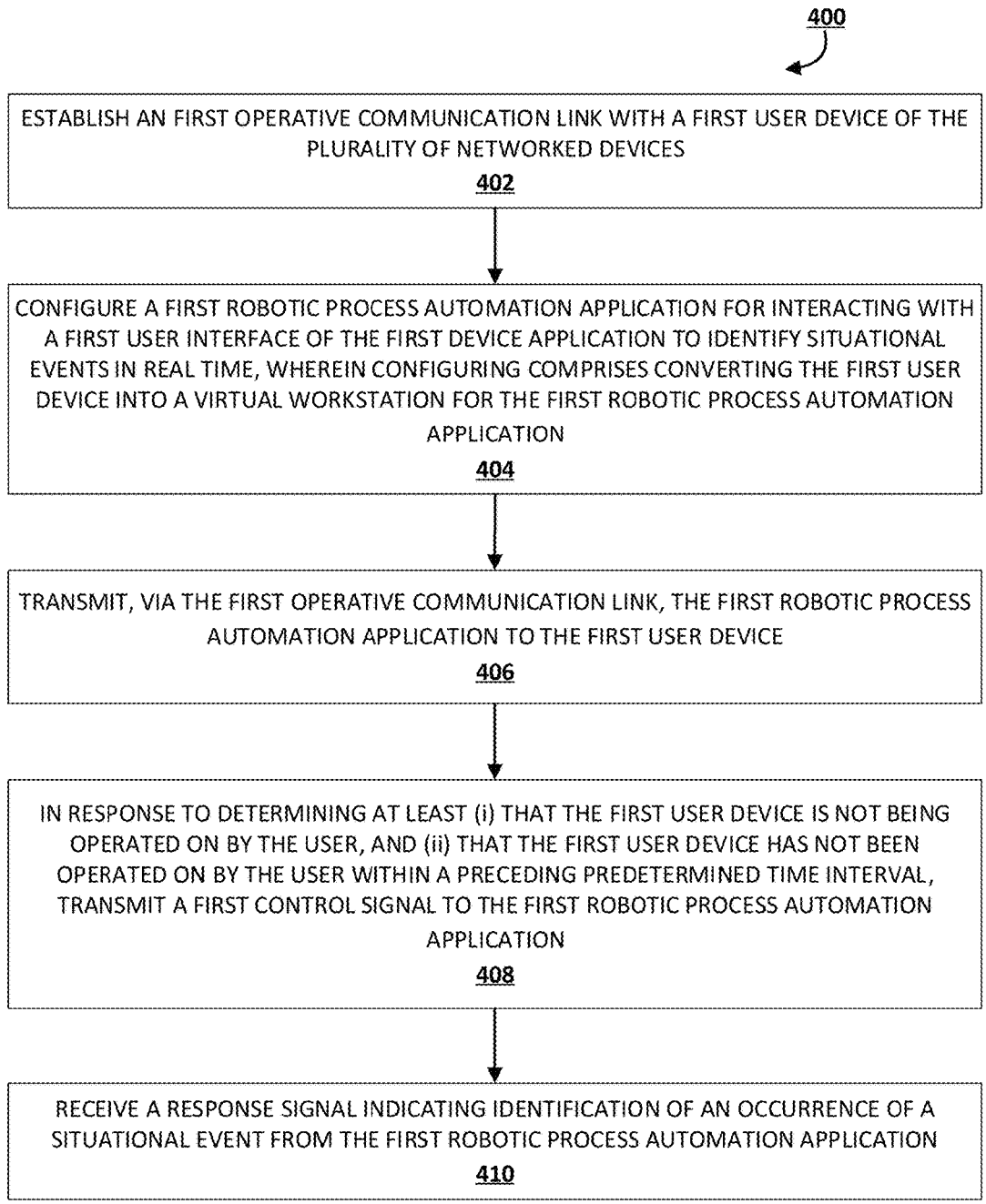
Figure 5:
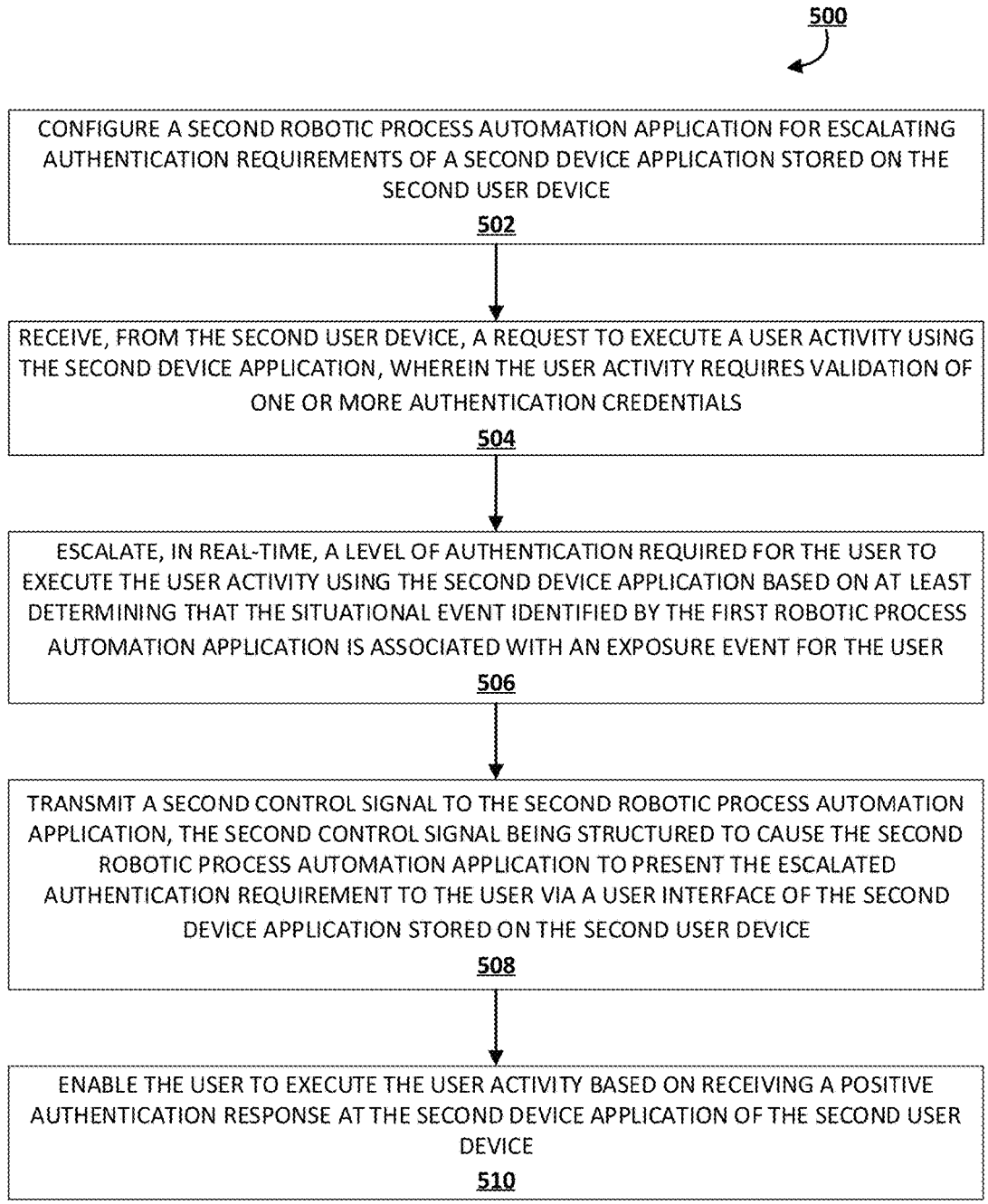
Figure 6:
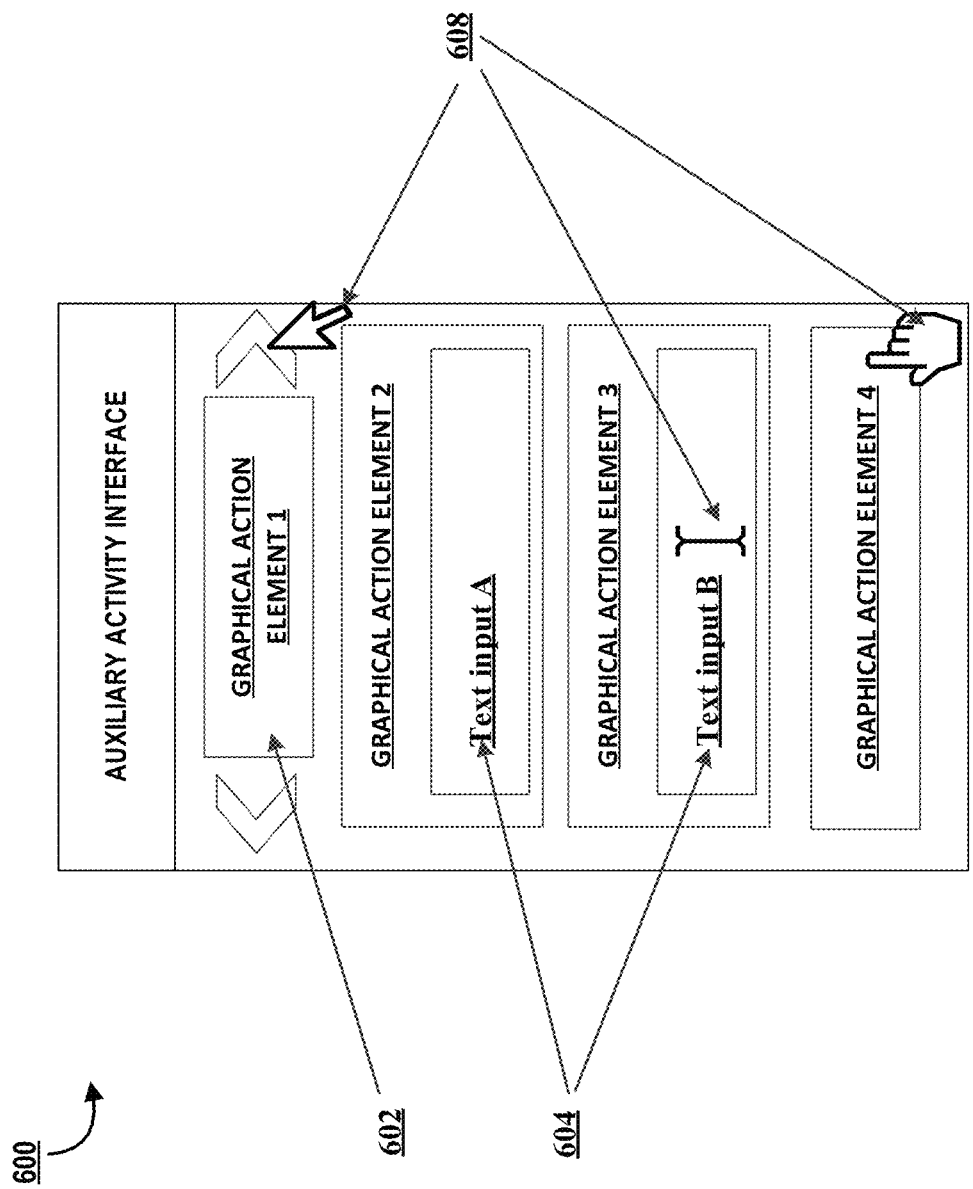
Figure 7A:
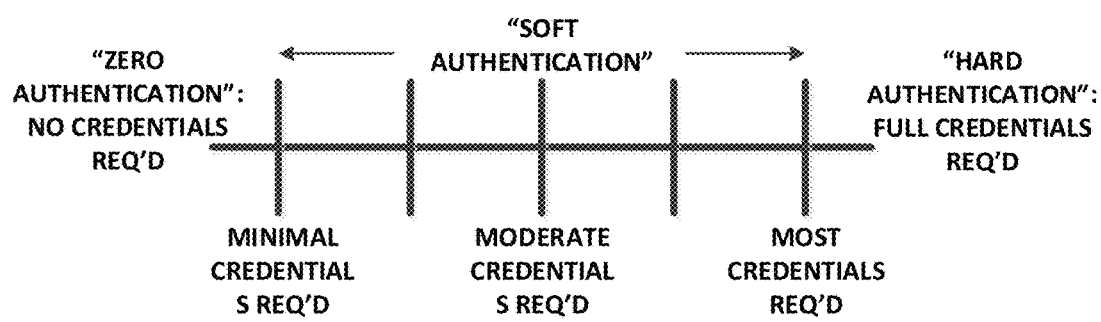
Figure 7B:
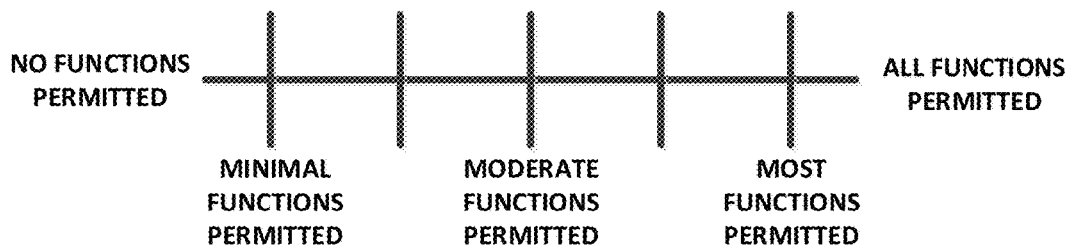
Figure 7C:
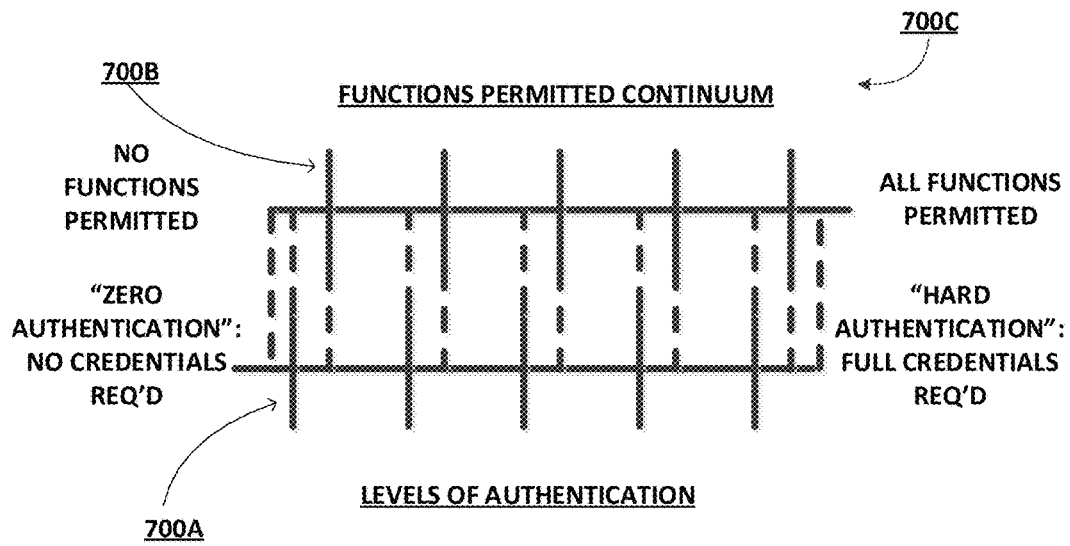
Figure 7D:
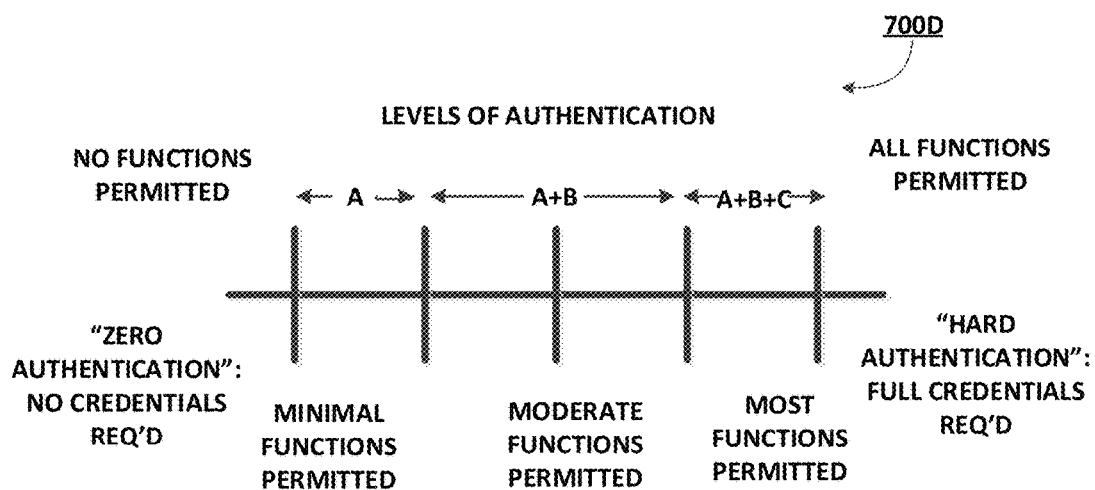

FIG. 3 schematically depicts a high level robotic process automation configuration application interface 300, in accordance with an aspect of the invention;

FIG. 4 schematically depicts a high level process flow 400 for authentication protocol elevation triggering, in accordance with an aspect of the invention;

FIG. 5 schematically depicts a high level process flow 500 for authentication protocol elevation triggering, in accordance with an aspect of the invention;

FIG. 6 schematically depicts a high level an auxiliary activity interface 600, in accordance with an aspect of the invention;

FIG. 7A presents an illustration of the authentication continuum in accordance to one embodiment of the invention;

FIG. 7B presents an illustration of the functions permitted continuum in accordance to one embodiment of the invention;

FIG. 7C presents an illustration of the coupling of the functions permitted continuum and the levels of authentication continuum in accordance to one embodiment of the invention; and FIG. 7D presents an illustration of the relationship between the functions permitted and the authentication types in accordance to one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building or a dwelling, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

"Robotic process automation" or "RPA" as used herein may refer to the automation of high-volume processes using bots.

"Robotic Process Automation Application," "RPA Bot" or "Bot" as used herein may refer to a dedicated infinitely customizable software application, typically configured for a dedicated workstation that performs automated tasks. In particular, a plurality of bots may be used by an entity to perform various functions for high-volume applications that relate to the entity's objectives to utilized existing third party applications and their interfaces, even if access to their data layer/application layer/code is not available. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e. by providing inputs to the interfaces of the other applications).

With advancements in technology infrastructures and wireless communication implementation, user devices, such as laptop computers, tablet computers, mobile phones, smart phones, wearable devices, smart television, and the like are common. Each user is typically associated with multiple user devices, e.g., a user may be associated with a smart phone, a laptop computer and another smart device (such as a wearable device, a smart television, a tablet device and/or the like). These user devices have the capability to hold large amounts of information, including personal information, resource data (information associated with user resources like banking accounts, payment instruments like credit cards and the like), and/or have access to a central storage of such data. In other aspects the user devices may enable access to resource data stored at other sources and databases based on requisite authorization. These devices may also be configured to enable the user to perform one or more activities, transactions or resource transfers through an application via online banking, mobile banking, mobile wallets and the like. As such, advancements in technology have facilitated numerous new methods for resource transfer and utilization with user devices. However, occurrence of external situational events (e.g., a natural disaster where the user may have been inadvertently separated from the user devices/secure user information, a breach of security of an entity (e.g., a hacking event) where unauthorized access to user information and devices may have been obtained by unauthorized individuals, or other external events) adversely affect the security of user information and compromise the security of the user devices. However, the user may not be aware of a compromise of the user data or user device until the intercepted data is used to perform at least one unauthorized activity/transaction at a later time, while the user's information continues to be at risk, or until an associated entity (e.g., a financial institution, a service provider etc.) informs the user of the compromise of security, by which time unauthorized individuals may have performed unauthorized actions in the meantime using the user's information without the user's knowledge/permission. In such instances, identifying the mode of the exposure and the specific technological parameter that needs to be addressed may be possible, if at all, after a significant time lapse succeeding the unauthorized activity. Hence, a need exists for authentication systems that provide proactive and dynamic escalation of authentication in real-time as the determination of external situational events, to ensure safety and security of user information.

The present invention provides a solution to the foregoing problems by providing an authentication protocol elevation triggering system structured for proactively and automatically elevating authentication requirements in response to identifying occurrence of a situational event. As discussed, each user is typically associated with multiple user devices, e.g., a user may be associated with a smart phone, a laptop computer and another smart device (such as a wearable device, a smart television, a tablet device and/or the like). These devices typically already comprise user applications, which based on receiving commands are configured to identify situational events. However, the user may not utilize these applications frequently. Moreover, the present invention identifies a first user device of the multiple user device that is not in use by the user or that is typically not frequently used by the user. For example, a user may be accustomed to using a smart phone more frequently and using a laptop computer or a tablet rarely. The system may then convert the first user device (e.g. the laptop computer or the tablet computer), that is not in use, into a virtual workstation for identifying situational events in real time, so that user's regular actions are not interrupted and so that processing resources are not diverted from user's customary activities. In this regard, the present invention leverages existing user device applications of the first user device to identify the occurrence of a situational event, in real-time, by providing input commands to the application to cause the application to perform certain functions.

However, one technical problem encountered for implementing this solution is that these existing user device applications are typically operated via user interfaces for receiving input, and the internal code of these existing applications on the user device, especially third-party applications, does not lend themselves for automated operation by external applications. Even if it were possible, automatic execution of input commands to an existing user interface would entail an extremely time consuming and expenditure intensive conversion of the internal code of the user interface of the user device application into a machine-to-machine form of data layer communication and creation of a new program to perform the functions, and would require immense in-depth technical skill and knowledge of application programming for a specialist operator of an entity (e.g., a financial institution) to code the conversion application. The present invention solves this technical problem by utilizing the user interfaces of the existing user applications themselves, which are readily available to the user (e.g., in response to requisite authentication) by assuming controls of input devices, without requiring the non-feasible and time intensive coding of a new machine-to-machine form program. The present invention is configured to automatically execute input functions of the user interface of the existing application using the controls of the user input devices for identification of occurrence of situational instances in real-time even if the device is not being operated upon by the user.

In addition, in another aspect, the present invention allows for extremely quick and easy structuring of an infinitely customizable robotic process automation (RPA) application for utilizing controls of the user input devices. This RPA application can be configured by an individual associated with an entity (e.g., a financial institution) or the user, using an intuitive interface, without requiring technical expertise. Hence, the present invention is structured to operate existing user interfaces of existing user device applications, even if the device is not being operated upon by the user, for the purposes of escalating authentication requirements in real-time. Moreover, based on identifying a situation instance/event, the invention is configured to escalate authentication requirements performing activities on all user devices (including activates performed using third-party applications of these devices), thereby enhancing the security of user information and devices. As discussed, embodiments of the present invention address the above needs and/or achieve other advantages by providing apparatuses (e.g., a system, computer program product and/or other devices) and methods for providing an authentication system for escalating network authentication requirements based on situational instance/events, as will be described in detail below. The advantages provided by the present invention in the regard of increased security are twofold. Firstly, the system provides proactive and preventative security measures that assess and augment the security of technological parameters/situational instance for an activity in real-time, before the occurrence of an unauthorized transaction. Secondly, the monitoring of the situational instance/technological parameters ensures that even if a future exposure event occurs, the required situational data is available to identify causes and parameters that need to be reinforced.

FIG. 1 illustrates a system environment 100 for authentication protocol elevation triggering based on situational instance, in accordance with one embodiment of the present invention. FIG. 1 provides a unique system that includes specialized servers and systems, communicably linked across a distributive network of nodes required to perform the functions of providing dynamic authentication paradigms. The authentication system provides a dynamic platform for determining authentication requirements in real-time. As illustrated in FIG. 1, a robotic process automation (RPA) system 105 or device 105 is operatively coupled, via a network 101 to the user system(s) 104 (e.g., a plurality of user devices 104a-104d), to the processing system 106 and to an authentication system 107 or application server. In this way, the robotic process automation system 105 can send information to and receive information from the user device(s) 104, the processing system 106 or financial institution server and the authentication system 107. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves, light waves or any other suitable means.

In some embodiments, the user 102 is an individual that has, owns or is otherwise associated with one or more user devices 104, and typically a plurality of user devices 104, that facilitate/allow the user to perform one or more user activities. The user devices typically comprise one or more of a smart phone 104a, a laptop or desktop computer 104b, a mobile phone or a personal digital assistant 104d, a tablet device 104c, wearable smart devices, smart television devices, home controllers, smart speakers, and/or other computing devices. In some embodiments, the user may be associated with a first user device (e.g., the tablet device 104c, a laptop or desktop computer 104b, or another smart/computing device) and a second user device (e.g., the smart phone 104a, or any of the user devices listed above).

FIG. 1 also illustrates a representative user system/device 104. As discussed, the user device(s) 104 may be, for example, a desktop personal computer, a mobile system, such as a cellular phone, smart phone, personal digital assistant (PDA), laptop, or the like, and each of the user devices (e.g., devices 104a-104d) may comprise the technical/electronic components described herein. The user device(s) 104 generally comprises a communication device 112, a processing device 114, a memory device 116, input device(s) 108 and output device(s) 105. The user device 104 may comprise other devices that are not illustrated, configured for location determination/navigation (GPS devices, accelerometers and other positioning/navigation devices), for authentication (fingerprint scanners, microphones, iris scanners, facial recognition devices/software and the like), for image capture (cameras, AR devices, and the like), for display (screens, hologram projectors and the like), and other purposes. The user device 104 is a computing system that enables the user to perform one or more user activities. The processing device 114 is operatively coupled to the communication device 112, input device(s) 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices), output device(s) 110 (screens 110a-110b, speakers, printers and other peripheral output devices) and other devices/components of the user device. The processing device 114 uses the communication device 112 to communicate with the network 101 and other devices on the network 101, such as, but not limited to the processing system 106 and the authentication system 107. As such, the communication device 112 generally comprises a modem, server, or other device for communicating with other devices on the network 101.

Each user device 104a-104d, typically comprises one or more user input devices 108, that are configured to receive instructions, commands, data, authentication credentials, audio/visual input and other forms of user input from the user, and transmit the received user input to the processing device 114 of the user device for processing. Similarly, each user device 104a-104d, typically comprises one or more user output devices 110, that are configured to transmit, display (e.g., via a graphical user interface), present, provide or otherwise convey an user output to the user, based on instructions from the processing device 114 of the user device. In some embodiments, the one or more user input devices 108 and/or one or more user output devices 110 are dual-function devices that are configured to both receive user input from the user and display output to the user (e.g., a touch screen display of a display device). For example, the dual function input devices 108 and/or the output devices 110 may present a user interface associated with one or more user device applications 112 (e.g., a graphical user interface) that is configured to receive user input and also provide user output.

The user device 104 comprises computer-readable instructions 120 and data storage 118 stored in the memory device 116, which in one embodiment includes the computer-readable instructions 120 of one or more user applications 122, e.g., a first device application and a second device application, (typically a plurality of user applications 122 such as operating system applications, device applications, third party applications, browser applications, network applications, and the like) that facilitate performance of one or more user activities. In some embodiments, the first device application of the one or more user applications 122 refers to an application stored on the user device that is configured to receive user instructions/input via an associated first user interface, and in accordance with the user input perform one or more tasks for identifying situational events, such as retrieve information, perform searches, query other applications/servers, and/or the like. For example, the first device application may be a search engine application, a web-browser application, a news application, and/or a third party or in-built application configured to provide situational event information when queried by the user. In some embodiments, the second device application of the one or more user applications 122 refers to an application stored on the user device (e.g., a different user device than the first device application or the same user device) that is configured facilitate performance of one or more user activities, typically based on successful authentication of the user. For example, the second device application may be a financial institution application, a utility provider application, a merchant application, a digital wallet application, a media streaming application, a navigation/positioning application, and/or other third party or in-built applications.

As discussed, in some embodiments, the user device 104 may refer to multiple user devices that may be configured to communicate with the authentication system and/or the financial institution system via the network 101. In some embodiment, the robotic process automation system 105, the processing system and/or the authentication system may transmit control signals to the user device, configured to cause the user application 122 to perform one or more functions or steps associated with assessing and escalating authentication requirements based on situational instance. The operative transformation of the inherent functions of the user device(s) 104 for converting the user device into a virtual workstation by the present invention (via, the RPA system 105) is described with respect to FIG. 2, later on.

As further illustrated in FIG. 1, the robotic process automation system 105 (also referred to as the RPA system 105) generally comprises a communication device 166, a processing device 168, and a memory device 170. As used herein, the term "processing device" or "processor" (e.g., processing devices 114, 138, 168 and 148) generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 168 is operatively coupled to the communication device 166 and the memory device 170. The processing device 168 uses the communication device 166 to communicate with the network 101 and other devices on the network 101, such as, but not limited to the processing system 106, the user system 104 and the authentication system 107. As such, the communication device 166 (and/or communication devices 112, 136, and 146) generally comprises a modem, server, or other device for communicating with other devices on the network 101.

As further illustrated in FIG. 1, the robotic process automation system 105 comprises computer-readable instructions 172 stored in the memory device 170, which in one embodiment includes the computer-readable instructions 172 of a robotic process automation configuration application 174 (also referred to as an RPA configuration application). In some embodiments, the memory device 170 includes data storage 171 (not illustrated) for storing data related to the system environment, but not limited to data created and/or used by the robotic process automation configuration application 174. In some embodiments, the robotic process automation configuration application 174 is configured for authentication protocol elevation triggering. Specifically, executing computer readable instructions of 172 of the RPA configuration application 174 is configured to cause processing device 168 to transmit certain control instructions to the one or more user devices to cause the respective processing devices (114) to carry out one or more steps described herein (e.g., with respect to FIGS. 4-5). Here, the RPA system 105 (also referred to as "the system" herein) is configured to configure a configure a first robotic process automation application for interacting with a first user interface of the first device application to identify situational events in real time by converting the first user device into a virtual workstation, and configure a second robotic process automation application for escalating authentication requirements of a second device application, among other steps described herein. The robotic process automation configuration system 105 may communicate with the processing system 106, the user device 104, the authentication system 107, merchant systems and other third party systems (not illustrated) to perform one or more steps described herein, and/or cause these systems to perform one or more of these steps, at least in part.

In some embodiments, the robotic process automation configuration application 172 may control the functioning of the user device 104. In some embodiments, the robotic process automation configuration application 174 comprises computer readable instructions 172 or computer-readable program code, the when executed by the processing device 168, causes the processing device to perform one or more steps involved in authentication protocol elevation triggering and/or to transmit control instructions to other systems and devices to cause the systems and devices to perform specific tasks. In some embodiments, the RPA system 105 and the processing system 106 may be embodied in the same system, or alternatively, the RPA system 105 and the processing system 106 may be separate systems as illustrated by FIG. 1.

As further illustrated in FIG. 1, the authentication system 107 generally comprises a communication device 146, a processing device 148, and a memory device 150. As discussed, as used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the processing system 106, the user system 104 and the RPA system 105. As such, the communication device 146 generally comprises a modem, server, or other device for communicating with other devices on the network 101.

As further illustrated in FIG. 1, the authentication system 107 comprises computer-readable instructions 154 stored in the memory device 150, which in one embodiment includes the computer-readable instructions 154 of an authentication application 158. In some embodiments, the memory device 150 includes data storage 152 for storing data related to the system environment, but not limited to data created and/or used by the authentication application 158. In some embodiments, the authentication application 158 provides assessment of network authentication requirements based on situational instance.

In the embodiment illustrated in FIG. 1 and described throughout much of this specification, the authentication application 158 may retrieve user authentication information, financial information based on instructions from the robotic process automation system 105, the and/or the processing system 106. In this way, the authentication application 158 may communicate with the robotic process automation system 105, processing system 106, the user device 104, merchant systems and other third party systems (not illustrated) to determine authentication requirements for a particular activity based on situational instance.

Moreover, as illustrated in FIG. 1, the processing system 106 (also referred to as a financial institution system 106) is connected to the authentication system 107 and is associated with a financial institution network. In this way, while only one processing system 106 is illustrated in FIG. 1, it is understood that multiple network systems may make up the system environment 100. The processing system 106 generally comprises a communication device 136, a processing device 138, and a memory device 140. The processing system 106 comprises computer-readable instructions 142 stored in the memory device 140, which in one embodiment includes the computer-readable instructions 142 of a processing system application 144. The processing system 106 may communicate with the authentication system 107 to provide authentication credentials for user activities.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 2, a schematic block diagram and process flow 200 is provided for converting the user device into a virtual workstation, in accordance with some embodiments of the invention. Specifically, FIG. 2 illustrates the operative functions of a user-machine interface, peripheral hardware and software/middleware components of each of the one or more user devices 104 (104a-104b), for example, the components of the first user device and the second user device. Typically, each user device 104 comprises user device hardware components 210 and user device software/middleware components 250. The hardware components 210 typically comprise input devices/peripherals 108 (e.g., keypads/keyboards 108a, touch screens 108b, mouse/pointing devices 108c, gesture/speech recognition sensors/devices, microphones, joysticks, authentication credential capture devices listed above, image capture devices, and other peripheral input devices) and output devices/peripherals (screens 110a-110b, speakers, printers and other peripheral output devices), which are typically operatively controlled by the processing device 114. The user device hardware components 210 may further comprise integrated circuit(s) 220 comprising a set of electronic circuits on a semiconductor material. In some embodiments, the integrated circuit 220 is a microprocessor 114 or processor 114, while in other embodiments, the integrated circuit 220 connects the input devices 108 and the output devices 110 with the processor 114 and/or the software components/memory of the user device. In some embodiments, the integrated circuit 220 comprises a graphics accelerator for presenting a graphical user interface on an output device 110. The software components 250 of the user device 104 may comprise virtual memory 230 having kernel space and user space and user device applications 122 or application software 112 (which may be run using the kernel space and/or user space based on the configuration of the user device application).

In some embodiments, during operation of a user device application 122, such as the first device application for identifying situational events, the user 102 may provide input to the user device application 122 via the input device(s) 108, as indicated by arrow 202. This input may be relayed to the integrated circuit 220, and subsequently processed by the device driver(s) 232 and input subsystems of the input event interface 234 in conjunction with the user device application 122, as illustrated.

In some embodiments of the present invention, the system (e.g., the RPA system 105) configures a robotic process automation (RPA) application 274 for interacting with a user interface of the user device application 122 (e.g., to identify situational events in real time, to escalate authentication requirements, etc.). Specifically, the system structures the first robotic process automation application to utilize controls of one or more input devices 108 of the user device 104 to interact with the user interface of the user device application 122 for converting the first user device into a virtual workstation for the first robotic process automation application. The system transmits and installs the RPA application at the memory device 116 of the user device 104. The RPA application 274 (e.g., the first RPA application and/or the second RPA application) is structured to ascertain a particular input or input data portion to be provided to the user interface of the user device application 122 for performing a particular task, e.g., a textual input comprising a first activity parameter, or a second activity parameter to be specified. In some embodiments, the RPA application 274 is structured to analyze the user interface to identify a pertinent graphical input element that is configured to receive the input data portion (e.g., a text box graphical input element for receiving the textual input comprising the first activity parameter, and/or a toggle element or drop down menu graphical input element for selecting the second activity parameter).

Next, the RPA application 274 is structured to identify an input device 108 of the plurality of input devices 108a-108c of the user device 104 that is associated with the input data portion. In some instances the RPA application 274 is structured to identify the input device, based on, at least in part, the type of graphical input element associated with the input data portion. For example, for the textual input comprising the first activity parameter to be entered, the system may identify an input device of a keyboard/keypad (virtual or physical) 108a or a touch screen 108b, based on identifying predetermined input devices for a textual input type, based on determining that the input has to be entered anew and not selected from existing options in the interface, and/or based on the associated graphical input element of the text box. As another example, for the second activity parameter to be selected, the system may identify an input device of a mouse/pointing device 108c or a touch screen 108b, based on identifying predetermined input devices for a selection input type, based on identifying that the selection of the second activity parameter requires 2-D spatial selection/actuation of a graphical element, and/or based on the associated graphical input element of the second activity parameter.

In response, the RPA application 274 is structured to identify an input signal format associated with the input device. For example, the keyboard/keypad (virtual or physical) 108a or the touch screen 108b for a textual input type, may typically transmit the received input from the user to the integrated circuit(s) 220 in a first input signal format, e.g., comprising key stroke signals or key codes or scancodes that make up the textual input in a particular format. As another example, the mouse/pointing device 108c or a touch screen 108b for a selection type input, may typically transmit the received input from the user to the integrated circuit(s) 220 in a second input signal format, e.g., electronic signals corresponding to the directional and spatial movement of the pointer/touch input in a particular format. Based on identifying the input signal format associated with the input device, the RPA application 274 is structured to transform the input data portion into the format of the associated input device. For example, the RPA application 274 is structured to transform the textual input comprising the first activity parameter first into key strokes and then into a group of associated scancodes, and the second activity parameter to be selected into the directional and spatial movement of the pointer/touch input in correlation with the layout of the user interface.

Next, the RPA application 274 is structured to assume the controls of the particular input device, and transmit the transformed input data portion in the format of the associated input device to the integrated circuit 220, as indicated by arrows 204 and 206. In some embodiments, the RPA application 274 is structured to utilize controls of the input devices by transmitting the transformed input data portion in the format of the associated input device directly to the integrated circuit 220, as indicated by the arrow 206. In some embodiments, the RPA application 274 is structured to utilize controls of the input devices by causing the input devices to transmit the transformed input data portion in the format of the associated input device to the integrated circuit 220, as indicated by arrow 204. As such, the RPA application 274 is structured to assume controls of input devices and automatically execute input functions of a user interface for performing one or more activities. The present invention allows for extremely quick and easy structuring of the RPA application 274 using the RPA configuration application 174 without requiring technical expertise, as will be described with respect to FIG. 3.

The integrated circuit(s) 220 may process the transformed input data and relay the data for processing at the device driver(s) 232 and input subsystems of the input event interface 234, where the transformed input data is interpreted (as an alphanumeric character or a selection/control function). This interpreted input data is correlated with the user interface and processed at the user device application 122. In some embodiments, the user device application 122 is configured to provide an output. This output may be processed by the device drivers 232 and converted into a format associated with the appropriate output device 110 and transmitted to the output device via the integrated circuit 220, as illustrated by FIG. 2.

Hence, the RPA application 274 is structured to operate existing user interfaces of existing user device applications, even if the device is not being operated upon by the user, for the purposes of escalating authentication requirements (as will be described below with respect to FIGS. 4-5). In the absence of the present invention, automatic execution of input functions of an existing user interface is typically not possible. Even if it were possible, automatic execution of input functions of an existing user interface would entail an extremely time and expense intensive conversion of the user interface of the user device application into a machine-to-machine form of data layer communication, and would require immense technical skill and knowledge of application programming.

As alluded to previously, the present invention is configured to automatically execute input functions of the user interface of the existing application using the controls of the user input devices for identification of occurrence of situational instances in real-time even if the device is not being operated upon by the user. Specifically, the present invention allows for extremely quick and easy structuring of an infinitely customizable robotic process automation (RPA) application 274 for utilizing controls of the user input devices to perform a myriad of tasks. This RPA application 274 can be configured by an individual associated with an entity (e.g., a financial institution) or the user, using an intuitive interface 174a of the RPA configuration application 174, without requiring technical expertise. Referring now to FIG. 3 illustrating a robotic process automation configuration application interface 174a of the RPA configuration application 174, in accordance with some embodiments of the invention. Specifically, FIG. 3 illustrates the robotic process automation configuration application interface 174a provided to an individual associated with an entity or the user (e.g., using display devices of the system 105, the system 106 or the user devices 104) to facilitate configuration of a dedicated robotic process automation application to perform certain functions. The individual or the user may configure multiple robotic process automation applications, each performing dedicated functions/activities, which may then be transmitted to appropriate user devices by the system 105.

The RPA configuration application interface 174a is a graphical user interface comprising a robotic process automation configuration workspace window 320 configured to allow the user to customize/configure the activity or functions process flow 350 of the robotic process automation application. Typically, the system (and/or the individual/user) may identify process steps associated with the particular activity to be performed by the RPA application and the user interface to be operated upon. The interface 174a comprises an activity process step toolbox 310 comprising one or more graphical function elements of various function types (e.g., actuation, selection, textual input, graphical manipulation, control functions, and the like). The interface 174a further comprises process attribute customization/initialization tool(s) 330 for providing process attributes for each of the process steps of the constructed process flow 350.

As discussed, the system (and/or the individual/user) may identify one or more process steps for interacting with a user interface of an application desired to be acted upon (e.g., the first user interface of the first device application). The system may then present the robotic process automation (RPA) configuration application interface 174a to the user/individual (e.g., using display device of the system 105, the system 106 or the user devices 104). As discussed, the robotic process automation configuration application interface 174a comprises one or more graphical function elements (310) associated with the one or more process steps. The interface 174a is structured to allow the user to configure a process flow, at least in partially (e.g., for interacting with the first user interface of the first device application to identify situational events in real time) by physically moving (e.g., dragging and dropping), using an input device (e.g., a mouse/pointer device or a touch screen) the one or more graphical function elements from first 2-D location coordinates of the RPA configuration application interface (e.g., from the activity process step toolbox 310) to second 2-D location coordinates of the RPA configuration application interface (e.g., to the RPA configuration workspace 320). The user may arrange the graphical function elements, each indicating a process step, in a suitable arrangement to construct the process flow 350. The interface 174a may allow the user to provide, for each of the one or more graphical elements, process attributes from the user (e.g., using the process attribute customization/initialization tool(s) 330). The RPA system 105 may then construct the first robotic process automation based on the configured process flow and the process attributes received from the user, and transmit the RPA application to the desired user device.

FIG. 4 illustrates a high level process flow 400 for authentication protocol elevation triggering, in accordance with some embodiments of the invention. In particular, the high level process flow 400 illustrates structuring a robotic process automation application for determining authentication requirements in real-time by converting a user device into a virtual workstation. These steps may be performed by the RPA system 105, via the RPA configuration application 174.

As illustrated by block 402, the system may establish a first operative communication link with a first user device (e.g., a tablet computer, a smart television, a laptop computer, or the like) of the plurality of networked devices (e.g., user devices 104). As discussed the first user device is associated with a user. The first user device may comprise a first device application 122a is stored on the first user device (e.g., device 104b). The first device application 122a may be an application that is configured to identify occurrence of situational events/instances in response to pertinent instructions/inputs. In some embodiments, the first device application 122a is typically configured to query, search, and/or analyze external databases, user news feeds, user social media feeds, and the like based on receiving the instructions/inputs via an associated first user interface.

Situational events/illustrations are external occurrences that may adversely affect the security of user information and may compromise the security of the user devices. In some embodiments, situational events may comprise a natural disaster where the user may have been inadvertently separated from the user devices/secure user information, a breach of security of an entity (e.g., a hacking event) where unauthorized access to user information and devices may have been obtained by unauthorized individuals, a predetermined activity trend associated with an exposure event, or other such external events. As discussed previously with respect to FIGS. 2 and 3, the system configures a first robotic process automation application for interacting with a first user interface of the first device application to identify situational events in real time, as illustrated by block 404. Typically, the system structures the first robotic process automation application to utilize controls of an input device of the first user device, in order to interact with the first user interface of the first device application for converting the first user device into a virtual workstation for the first robotic process automation application, as described previously with respect to FIG. 2. Here, as discussed, the system is configured to identify a first input data portion to be provided at the first user interface of the first device application for identify situational events. Next the system may identify the input device of a plurality of input devices of the first user device that is associated with the first input data portion. The system may also identify an input signal format associated with the input device. Finally, the system may transform the first input data portion into the input signal format associated with the input device, and transmit, to the first device application, input device control signals for the first input data in the input signal format. Next, as illustrated by block 406, the system transmits, via the first operative communication link, the first robotic process automation application to the first user device. The system may install and activate the first robotic process automation application on the first user device based on requisite permissions/authorization from the user.

As discussed, each user is typically associated with multiple user devices, e.g., a user may be associated with a smart phone, a laptop computer and another smart device (such as a wearable device, a smart television, a tablet device and/or the like). These devices typically already comprise user applications, which based on receiving commands are configured to identify situational events. However, the user may not utilize these applications frequently. Moreover, the present invention identifies a first user device of the multiple user device that is not in use by the user or that is typically not frequently used by the user. For example, a user may be accustomed to using a smart phone more frequently and using a laptop computer or a tablet rarely. The system may then convert the first user device (e.g. the laptop computer or the tablet computer), that is not in use, into a virtual workstation for identifying situational events in real time, so that user's regular actions are not interrupted and so that processing resources are not diverted from user's customary activities. Now, referring to block 408, the system may transmit a first control signal (via the first operative communication link) to the first robotic process automation application in response to determining at least: (i) that the first user device is not being operated on by the user, and (ii) that the first user device has not been operated on by the user within a preceding predetermined time interval. For example, the system may transmit the first control signal to a first user device of a laptop computer/a smart television based on determining (i) that the user is not currently operating the device (e.g., based on analyzing current and historical usage patterns of the first user device), (ii) that the user has not utilized the first user device within the preceding predetermined time period (e.g., 2-5 hours), and/or (iii) that the first user device is not in the midst of, or scheduled to run predetermined user processes within a predetermined time window (e.g., based on analyzing user preferences, process schedules of the device, etc.). Typically, the first control signal is structured to cause the first robotic process automation application to interact with the first user interface of the first device application, i.e., provide instructions and input to the user interface by utilizing controls of the input device of the first user device, as described with respect to FIG. 2.

The first device application may receive the input/instructions provided by the first robotic process automation application to the first user interface, and provide an output of identified occurrence situational events, if any, in real time. The first robotic process automation application may then transmit a response signal indicating identification of an occurrence of a situational event, to the system, as indicated by block 410.

FIG. 5 illustrates a high level process flow 500 for authentication protocol elevation triggering, in accordance with some embodiments of the invention. In particular, the high level process flow 500 illustrates escalation of authentication requirements in real-time based on identification of an occurrence of a situational event of process flow 400 of FIG. 4. The process flow 500 is directed to, in general, dynamic determination of authentication requirements for a certain user activity, based on determining congruence of aspects of the user activity with exposure events/situational events.

As illustrated by block 502, the system is configured to establish a second operative communication link with a second user device (e.g., a smart phone device, or the like) of the plurality of networked devices (e.g., user devices 104). As discussed the second user device is associated with the user and comprises the second device application 122b is stored on the second user device (e.g., device 104a). The second device application 122a may be an application that is configured to allow the user to perform one or more user activities (e.g., resource transfers, data access, purchases, etc.) based on requisite authentication. The system may configure a second robotic process automation application for escalating authentication requirements of the second device application 122b stored on the second user device, in a manner similar to that described with respect to the first robotic process automation application in FIGS. 2-4. The system may then transmit, via the second operative communication link, the second robotic process automation application to the second user device.

As illustrated block 504, the system may receive from the second user device (via the second operative communication link), a request to execute a user activity using the second device application. As discussed, the user activity typically requires validation of one or more authentication credentials. In this regard, the system may receive a request from a user seeking to execute a user activity. The user activity may comprise one or more activities associated with an entity or a financial institution described previously. In this regard, the user may employ a user device 104, (e.g., a mobile device or another computing device) to perform an electronic activity (e.g., in which the user interacts with the processing system 106, or another entity/merchant system). For example, the user may access and/or perform another activity (e.g., transfer funds or pay bills) using an online banking account at a financial institution. By way of further example, the user may perform a mobile wallet transaction. As another example, the user may purchase goods or services using a bank account at a financial institution.

Typically, execution of the user activity requires validation of one or more authentication credentials, based on the type of activity. In this regard, the user activity may be associated one or more authentication credentials related to an existing level of authentication. For example, a user activity comprising accessing a mobile device application may be require authentication using a username and password. The credentials of username and password may be associated with a first level of authentication. As another example, another user activity comprising initiating a purchase using a user application may require credentials with a second, higher level of authentication, for example payment instrument identifiers and their associated personal identification numbers (PIN).

However, the existing level or authentication or default authentication, associated with the activity itself, may not be satisfactory in instances where the user may be potentially exposed to misappropriation or in instances where chances of unauthorized access to the user's personal and financial information is heightened, i.e., during occurrences of situational events. With electronic activities becoming ubiquitous, the technological parameters associated with the user activity or the situational instance of the user activity, like the method of conducting the activity (online, mobile, purchase transactions using tokens, card present transaction, and the like), the technical aspects of the device used to conduct the activity (network connections, stored applications, authentication features), physical location of the user activity, merchants and other entities that gain access to user's financial/personal information (in both electronic and physical forms) in the course of the activity, influence the security and confidence in the user activity. Since the methods and modes of intercepting personal information and exposure in electronic activities are greater in number and technically varied, in comparison with non-electronic transactions like payment with cash/currency, there is a need for effective systems to safeguard personal and financial information and to mitigate exposure of electronic activities. The present invention provides a novel solution configured to dynamically assess the authentication requirements, based on the both the type of the user activity and the occurrence of the situational events, to ensure security and safety of the user's financial and personal information. In such instances of determined potential compromise, the system may escalate, in real-time, the required level of authentication from the existing level (for example, a passcode) to a higher level (for example, a fingerprint scan) for executing the user activity as long as the parameters associated with the activity deem to require such. In some embodiments, the system may deny/decline the request to execute a user activity based on the congruence of the technological parameters/situational instance of the user activity and certain exposure events, to safeguard personal information.

In some embodiments, the request comprises the user accessing or opening an application associated with the activity, via the second user device. For example, the user opening a mobile banking application (second device application) to view account balances or opening a page within the application to modify account preferences. In some embodiments, the request comprises receiving the existing/default authentication credentials from the user. In some embodiments, the system constantly monitors the user's devices and activities based on requisite permissions from the user, and the subsequent steps are triggered, automatically, in response to the system identifying that the user seeks to execute the user activity. For example, the system may identify that the user seeks to initiate a purchase (user activity) based on determining that the user has initiated a check-out step for purchasing one or more products using a merchant application (second device application). The system may then, automatically, initiate assessment of the user's situational instance and authentication requirements before allowing the user to provide personal/financial information (address, contact information, payment information). Here, the system may prevent check-out, dissuade input of personal information, lock the display screen of the device or otherwise suspend certain functionality associated with the merchant application and/or the mobile device, until the requirement of escalated authentication based on situational instance is ascertained and/or authentication credentials associated with escalated levels of authentication are validated. In this regard, the system may be overarching and may be configured to control one or more applications, operating system, user interface and other functionality associated with the second user device, based on receiving prior authorization from the user.

In some embodiments, establishing an operative communication link with the second user device (of the first user device) comprises identifying the second user device (first user device) and/or the user associated with the second user device. The second user device may be identified by gathering device identification information from the second user device to generate the device's "fingerprint," or unique signature of the second user device. Device identification information may be collected from a variety of sources. In some embodiments, the device identification information includes an identification code. The identification code may be but is not limited to a serial number or an item number of the device. In some embodiments, the device identification information may be associated with a chip associated with the second user device. The chip may be but is not limited to a subscriber identification module (SIM) card, removable hard drive, processor, microprocessor, or the like. In other embodiments, the device identification information may be associated with a removable part of the second user device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the second user device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the second user device without requiring user input. For example, the device identification information may be automatically provided by the second user device. Alternatively, the second user device may provide the information without requiring user input after receiving a request from a system for the identification information. In other embodiments, device identification information may be entered manually at the second user device. For example, if the second user device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored, associated with the user profile (user profile comprising user authentication information, user authorization, user preferences and the like) and subsequently used to identify the user of the second user device, when requests to execute user activities are received. In other embodiments, the user associated with the user activity may be identified based on default authentication credentials, user application information and the like and then correlated with one or more accounts associated with the user.

Next, at block 506, the system may determine whether the situational event identified by the first robotic process automation application is associated with an exposure event for the user, i.e., whether the situational event is likely to cause a compromise of the user information. In some embodiments, determining that the situational event identified by the first robotic process automation application is associated with the exposure event for the user comprises determining that a geographical location of the user is within a predetermined distance from a location of the natural disaster (e.g., the natural disaster being within 5 miles of the user's residence location or the current user location). In some embodiments, determining that the situational event identified by the first robotic process automation application is associated with the exposure event for the user comprises determining that the user is associated with the entity (e.g., determining that the user has an account or is otherwise associated with the entity subjected to breach of security). In some embodiments, determining that the situational event identified by the first robotic process automation application is associated with the exposure event for the user comprises determining that the user is associated with the predetermined activity trend that was determined to be associated with an exposure event (e.g., identifying predetermined flagged activity patterns of the user device, such as downloads, or predetermined flagged transactions in a user account). In this regard, the system may compare and correlate the determined situational instance with user information to ascertain whether the situational instance is likely to affect the user information security.

The system may then escalate, in real-time, a level of authentication required for the user to execute the user activity using the second device application based on at least determining that the situational event identified by the first robotic process automation application is associated with an exposure event for the user. In this regard, the system may identify the default or current authentication requirements or authentication level required, for the user to execute the activity. The system may ascertain the escalated higher authentication level required based on the identified at least one situational event. Alternately, in some embodiments, the system may limit the permissible functions for the given default level of authentication based on determining that the situational event identified by the first robotic process automation application is associated with an exposure event for the user. For example, the system may only allow the user to view account balances, but may block payments/transactions based on determining that the situational event identified by the first robotic process automation application is associated with an exposure event for the user.

Typically, the user authentication is associated with multiple, predetermined levels of authentication, based on the functions that are permitted for the given authentication level. For example, a lowest level of authentication may be sufficient to execute certain functions/activities like opening an application, viewing predetermined content and the like. A higher level of authentication may be required for other functions like modifying content, performing purchases. Typically, the level of authentication may be associated with one or more types of authentication credentials. For example, a low level of authentication may be associated with authentication credential types like a passcode, a swipe gesture, or no requirement for credentials at all. A moderate level of authentication may be associated with authentication credentials types like a username accompanied by an alphanumeric password, an account identifier along with an expiration date and the like. A high level of authentication may be associated with authentication credential types like biometric information (fingerprint scans, iris scans/facial recognition, voice recognition and the like), username accompanied by a one-time passcode generated/provided on another linked user device and the like. In some embodiments, the authentication level may be escalated using a combination of the authentication credential types. For example, the authentication level of a username-passcode authentication may be increased to a higher level with the user providing additional out of wallet credentials like predefined security questions, user contact information, identification information and the like. There may be multiple levels of authentication (3, 10, 15, or the like), with each level being associated with a numeric, alphabetic, visual or another suitable identifier.

Next, at block 508, the system transmits a second control signal to the second robotic process automation application (via the second operative communication link). The second control signal is structured to cause the second robotic process automation application to present the escalated authentication requirement to the user via a user interface of the second device application stored on the second user device. In some embodiments, the system transmits, to the second device application, an authentication control signal configured to cause the second device application to present the escalated authentication requirement to the user via the user interface of the second device application. Moreover, in some embodiments, the system is configured to identify a display device of a plurality of output devices of the second user device that is associated with presenting the user interface of the second device application. The system may then identify an output signal format associated with the display device of the second user device, and subsequently transmit, to the display device, display device control signals for presenting the escalated authentication requirement to the user via the user interface of the second device application.

In some embodiments, the system may determine whether current user security features meet the escalated authentication requirement for the user activity. The system may determine one or more types of new security features that meet the escalated authentication requirement and subsequently enable the user to modify the current user security features based on the determined new security features. As described previously, the system may block functionality associated with the mobile phone, until (i) successful validation of escalated authentication credentials received from the user and/or (ii) the situational instance of the user activity is no longer associated with an exposure/potential compromise for the user. The system may enable the user to execute the user activity based on receiving a positive authentication response at the second device application of the second user device, at block 510.

In some embodiments, the system may then determine one or more applications associated with the first user device and/or second user device, based on retrieving application information from the first user device and the second user device. The one or more applications comprise applications stored on the first user device and/or the second user device. The system may then compare the user application information with the activity data to determine if one or more applications stored on the user's mobile device or their entities/providers are associated with exposure events/ breach or security. In this regard the system may consider all applications stored on the first user device and/or second user device, applications currently running or active, and/or applications running in the background. For example, the system may determine that the first user device and/or second user device is associated with application 1 stored on the device. The system may further determine that the application 1 was identified to be associated with a breach of data event, unbeknownst to users. In response the system may escalate the level of authentication required for the user activity based on at least determining that at least one of the one or more applications is associated with the entity associated with the security breach. Continuing with the previous example, the system may escalate the authentication required to access the user's information, such that the application 1 is not able to access the user's information. In some embodiments, the system may disable the active application 1 for the period of the user activity and/or uninstall the application 1 based on receiving authorization from the user.

FIG. 6, illustrates a high level an auxiliary activity interface 600, in accordance with some of the invention. In some embodiments, in response to receiving a positive authentication response at the second device application, the system is configured to identify an auxiliary activity associated with mitigation of the situational event. The auxiliary activity may comprise an activity that may prevent exposure of the user's data/information due to the situational event or that may limit the exposure by reinforcing security or by addition additional security measures. The second device application is configured to facilitate the performance of the auxiliary activity, e.g., implement additional security measures (for example, close existing services subscribed to by the user relating to the exposure/situational event and initiate subscription to new services) based on receiving user input/ permissions. Here, the system identifies an auxiliary activity interface 600 of the second device application that allows or is configured to facilitate performing the auxiliary activity.

Subsequently, the system may transmit, to the second device application, control instructions that are configured to cause the second device application to present the auxiliary user interface on a display device of the second user device. The system may then identify a graphical input element (e.g., 602, 604) of the auxiliary user interface that is associated with receiving the auxiliary user input. As described with respect to FIG. 2, the system identifies an input device of a plurality of input devices of the second user device that is associated with the graphical input element. The system may then identify an input signal format associated with the input device. For example, for the graphical input element 604 comprising the first activity parameter to be entered as a textual input, the system may identify an input device of a keyboard/keypad (virtual or physical) 108a or a touch screen 108b, based on identifying predetermined input devices for a textual input type, based on determining that the input has to be entered anew and not selected from existing options in the interface, and/or based on the associated graphical input element of the text box. As another example, for the graphical input element 602 comprising the second activity parameter to be selected from a rolodex element, the system may identify an input device of a mouse/pointing device 108c or a touch screen 108b, based on identifying predetermined input devices for a selection input type, based on identifying that the selection of the second activity parameter requires 2-D spatial selection/actuation of a graphical element, and/or based on the associated graphical input element of the second activity parameter.

Next, the system may transmit, to the second device application, input device control signals for the auxiliary user input in the input signal format. The input device control signals are configured to cause the second device application to pre-fill the auxiliary user input in the graphical input element in a presentation of the auxiliary user interface on the display device of the second user device, by manipulating pointer and text cursor controls, as indicated by 608. As such, the system determines an auxiliary user input required for performing the auxiliary user activity and transmits, to the second device application, the auxiliary user input using controls of an input device associated of the second user device.

As alluded to previously, the user is typically required to authenticate their identity in order to complete a user activity (e.g., an electronic transaction). Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 7A, a continuum of authentication 700A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 7C, the continuum of authentication 700A may be coupled with a functions permitted continuum 700B, first illustrated in FIG. 7B.

Referring to FIG. 7B, the functions permitted continuum 700B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 700B corresponds with a certain amount and/or number of functions that are permitted and/or the context in which certain functions are permitted.

Referring now to FIG. 7C, a diagram 700C illustrates a coupling of the functions permitted continuum 700B and the levels of authentication continuum 700A. As shown, the continua 700B and 700A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 700B provides that a particular function or functions may be permitted given that a specified level of authentication credentials are supplied, as indicated by the corresponding point on continuum 700A. For example, the system, a financial institution and/or a user may arrange the continua 700B and 700A with respect to one another and may adjust the arrangement based on changing desires or goals and situational instance with respect to exposure events.

In some embodiments, one or both the continua 700B and 700A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on exposure events. For example, if the user is typically required to provide a username and password to complete a type of activity, but the level of authentication required is increased in accordance with block 210, then the user may be prompted to provide additional (e.g., secondary) authentication information, such as a PIN or a zip code associated with the user.

Referring now to FIG. 7D, a diagram 700D illustrates a relationship between the functions permitted and the authentication types. As shown in FIG. 7D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A robotic process automation system for authentication protocol elevation triggering system, wherein the system provides a dynamic platform for structuring a robotic process automation application for determining authentication requirements in real-time by converting a user device into a virtual workstation, the system comprising:
    at least one memory device;
    at least one communication device connected to a distributed network, wherein the communication device is configured to establish operative communication with a plurality of networked devices;
    at least one processing device;
    a robotic process automation module stored in the memory comprising executable computer readable instructions that when executed by the at least one processing device are configured to cause the processing device to:
        establish an first operative communication link with a first user device of the plurality of networked devices, wherein the first user device is associated with a user, wherein a first device application is stored on the first user device;
        configure a first robotic process automation application for interacting with a first user interface of the first device application to identify situational events in real time, wherein configuring comprises structuring the first robotic process automation application to utilize controls of an input device of the first user device to interact with the first user interface of the first device application for converting the first user device into a virtual workstation for the first robotic process automation application;
        transmit, via the first operative communication link, the first robotic process automation application to the first user device;
        in response to determining at least (i) that the first user device is not being operated on by the user, and (ii) that the first user device has not been operated on by the user within a preceding predetermined time interval, transmit a first control signal, via the first operative communication link, to the first robotic process automation application, the first control signal being structured to cause the first robotic process automation application to interact with the first user interface of the first device application to identify situational events in real time by utilizing controls of the input device of the first user device;
        receive, via the first operative communication link, a response signal indicating identification of an occurrence of a situational event from the first robotic process automation application;
        establish a second operative communication link with a second user device of the plurality of networked devices, wherein the second user device is associated with the user;
        configure a second robotic process automation application for escalating authentication requirements of a second device application stored on the second user device;
        transmit, via the second operative communication link, the second robotic process automation application to the second user device;
        receive, via the second operative communication link, from the second user device, a request to execute a user activity using the second device application, wherein the user activity requires validation of one or more authentication credentials;
        escalate, in real-time, a level of authentication required for the user to execute the user activity using the second device application based on at least determining that the situational event identified by the first robotic process automation application is associated with an exposure event for the user;
        transmit a second control signal, via the second operative communication link, to the second robotic process automation application, the second control signal being structured to cause the second robotic process automation application to present the escalated authentication requirement to the user via a user interface of the second device application stored on the second user device; and
        enable the user to execute the user activity based on receiving a positive authentication response at the second device application of the second user device.

2. The system of claim 1, wherein the situational event identified by the first robotic process automation application comprises at least one of occurrence of a natural disaster, breach of security of an entity, and a predetermined activity trend associated with the exposure event.

3. The system of claim 2, wherein determining that the situational event identified by the first robotic process automation application is associated with the exposure event for the user comprises at least one of (i) determining that a geographical location of the user is within a predetermined distance from a location of the natural disaster, (ii) determining that the user is associated with the entity, and (iii) determining that the user is associated with the predetermined activity trend.

4. The system of claim 1, wherein the situational event identified by the first robotic process automation application comprises a breach of security of an entity, wherein the module further comprises instructions that cause the at least one processing device to:
    retrieve application information from the first user device and the second user device;
    determine one or more applications associated with the first user device and/or the second user device, wherein the one or more applications comprise applications stored on the first user device and/or the second user device; and escalate the level of authentication required for the user activity based on at least determining that at least one of the one or more applications is associated with the entity associated with a security breach.

5. The system of claim 1, wherein the second robotic process automation application is further configured to lock a display of the second user device until the positive authentication response is received.

6. The system of claim 1, wherein the module further comprises instructions that cause the at least one processing device to:

determine whether current user security features meet the escalated authentication requirement for the user activity;

determine one or more types of new security features that meet the escalated authentication requirement; and enable the user to modify the current user security features based on the determined new security features.

7. The system of claim 1, wherein configuring the first robotic process automation application for interacting with the first user interface of the first device application comprises configuring the first robotic process automation application to:

identify a first input data portion to be provided at the first user interface of the first device application for identifying situational events;

identify the input device of a plurality of input devices of the first user device that is associated with the first input data portion;

identify an input signal format associated with the input device;

transform the first input data portion into the input signal format associated with the input device; and transmit, to the first device application, input device control signals for the first input data in the input signal format.

8. The system of claim 1, wherein the module further comprises instructions that cause the at least one processing device to configure the second robotic process automation application to:

transmit, to the second device application, an authentication control signal configured to cause the second device application to present the escalated authentication requirement to the user via the user interface of the second device application.

9. The system of claim 1, wherein the module further comprises instructions that cause the at least one processing device to configure the second robotic process automation application to:

identify a display device of a plurality of output devices of the second user device that is associated with presenting the user interface of the second device application;

identify an output signal format associated with the display device of the second user device; and transmit, to the display device, display device control signals for presenting the escalated authentication requirement to the user via the user interface of the second device application.

10. The system of claim 1, wherein the module further comprises instructions that cause the at least one processing device to:

in response to receiving the positive authentication response at the second device application, identify an auxiliary activity associated with mitigation of the situational event, wherein the second device application is configured to facilitate the performance of the auxiliary activity based on receiving user input;

identify an auxiliary activity interface of the second device application associated with receiving the user input for performing the auxiliary activity;

transmit, to the second device application, control instructions that are configured to cause the second device application to present the auxiliary user interface on a display device of the second user device;

determine an auxiliary user input required for performing the auxiliary user activity; and transmit, to the second device application, the auxiliary user input using controls of an input device associated of the second user device.

11. The system of claim 10, wherein transmitting the auxiliary user input to the second device application using the controls of the input device of the second user device further comprises:

identifying a graphical input element of the auxiliary user interface that is associated with receiving the auxiliary user input;

identifying an input device of a plurality of input devices of the second user device that is associated with the graphical input element;

identifying an input signal format associated with the input device of the second user device; and transmitting, to the second device application, input device control signals for the auxiliary user input in the input signal format, wherein the input device control signals are configured to cause the second device application to pre-fill the auxiliary user input in the graphical input element in a presentation of the auxiliary user interface on the display device of the second user device.

12. The system of claim 1, wherein configuring the first robotic process automation application for interacting with the first user interface of the first device application to identify situational events in real time, further comprises:

identifying one or more process steps for interacting with the first user interface of the first device application;

presenting a robotic process automation (RPA) configuration application interface to the user, wherein the robotic process automation configuration application interface comprises one or more graphical function elements associated with the one or more process steps;

allow the user to configure a process flow for interacting with the first user interface of the first device application to identify situational events in real time by physically moving, using the input device, each of the one or more graphical function elements from first 2-D location coordinates of the RPA configuration application interface to second 2-D location coordinates of the RPA configuration application interface;

receive, for each of the one or more graphical elements, process attributes from the user;

construct the first robotic process automation application based on the configured process flow and the process attributes received from the user.

13. A computer program product for authentication protocol elevation triggering system, wherein the computer program product provides a dynamic platform for structuring a robotic process automation application for determining authentication requirements in real-time by converting a user device into a virtual workstation, comprising a non-transitory computer-readable storage medium having computer-executable instructions that when executed by a processing device are configured to cause the processing device to:

establish an first operative communication link with a first user device of a plurality of networked devices, wherein the first user device is associated with a user, wherein a first device application is stored on the first user device;

configure a first robotic process automation application for interacting with a first user interface of the first device application to identify situational events in real time, wherein configuring comprises structuring the first robotic process automation application to utilize controls of an input device of the first user device to interact with the first user interface of the first device application for converting the first user device into a virtual workstation for the first robotic process automation application;

transmit, via the first operative communication link, the first robotic process automation application to the first user device;

in response to determining at least (i) that the first user device is not being operated on by the user, and (ii) that the first user device has not been operated on by the user within a preceding predetermined time interval, transmit a first control signal, via the first operative communication link, to the first robotic process automation application, the first control signal being structured to cause the first robotic process automation application to interact with the first user interface of the first device application to identify situational events in real time by utilizing controls of the input device of the first user device;

receive, via the first operative communication link, a response signal indicating identification of an occurrence of a situational event from the first robotic process automation application;

establish a second operative communication link with a second user device of the plurality of networked devices, wherein the second user device is associated with the user;

configure a second robotic process automation application for escalating authentication requirements of a second device application stored on the second user device;

transmit, via the second operative communication link, the second robotic process automation application to the second user device;

receive, via the second operative communication link, from the second user device, a request to execute a user activity using the second device application, wherein the user activity requires validation of one or more authentication credentials;

escalate, in real-time, a level of authentication required for the user to execute the user activity using the second device application based on at least determining that the situational event identified by the first robotic process automation application is associated with an exposure event for the user;

transmit a second control signal, via the second operative communication link, to the second robotic process automation application, the second control signal being structured to cause the second robotic process automation application to present the escalated authentication requirement to the user via a user interface of the second device application stored on the second user device; and enable the user to execute the user activity based on receiving a positive authentication response at the second device application of the second user device.

14. The computer program product of claim 13, wherein the situational event identified by the first robotic process automation application comprises at least one of occurrence of a natural disaster, breach of security of an entity, and a predetermined activity trend associated with the exposure event.

15. The computer program product of claim 13, wherein the non-transitory computer-readable storage medium further comprises computer-executable instructions that when executed by the processing device are configured to cause the processing device to:

determine whether current user security features meet the escalated authentication requirement for the user activity;

determine one or more types of new security features that meet the escalated authentication requirement; and enable the user to modify the current user security features based on the determined new security features.

16. The computer program product of claim 13, wherein configuring the first robotic process automation application for interacting with the first user interface of the first device application comprises configuring the first robotic process automation application to:

identify a first input data portion to be provided at the first user interface of the first device application for identifying situational events;

identify the input device of a plurality of input devices of the first user device that is associated with the first input data portion;

identify an input signal format associated with the input device;

transform the first input data portion into the input signal format associated with the input device; and transmit, to the first device application, input device control signals for the first input data in the input signal format.

17. A computerized method for authentication protocol elevation triggering system, wherein the computerized method provides a dynamic platform for structuring a robotic process automation application for determining authentication requirements in real-time by converting a user device into a virtual workstation, the computerized method comprising:

establishing an first operative communication link with a first user device of a plurality of networked devices, wherein the first user device is associated with a user, wherein a first device application is stored on the first user device;

configuring a first robotic process automation application for interacting with a first user interface of the first device application to identify situational events in real time, wherein configuring comprises structuring the first robotic process automation application to utilize controls of an input device of the first user device to interact with the first user interface of the first device application for converting the first user device into a virtual workstation for the first robotic process automation application;

transmitting, via the first operative communication link, the first robotic process automation application to the first user device;

in response to determining at least (i) that the first user device is not being operated on by the user, and (ii) that the first user device has not been operated on by the user within a preceding predetermined time interval, transmitting a first control signal, via the first operative communication link, to the first robotic process automation application, the first control signal being structured to cause the first robotic process automation application to interact with the first user interface of the first device application to identify situational events in real time by utilizing controls of the input device of the first user device;

receiving, via the first operative communication link, a response signal indicating identification of an occurrence of a situational event from the first robotic process automation application;

establishing a second operative communication link with a second user device of the plurality of networked devices, wherein the second user device is associated with the user;

configuring a second robotic process automation application for escalating authentication requirements of a second device application stored on the second user device;

transmitting, via the second operative communication link, the second robotic process automation application to the second user device;

receiving, via the second operative communication link, from the second user device, a request to execute a user activity using the second device application, wherein the user activity requires validation of one or more authentication credentials;

escalating, in real-time, a level of authentication required for the user to execute the user activity using the second device application based on at least determining that the situational event identified by the first robotic process automation application is associated with an exposure event for the user;

transmitting a second control signal, via the second operative communication link, to the second robotic process automation application, the second control signal being structured to cause the second robotic process automation application to present the escalated authentication requirement to the user via a user interface of the second device application stored on the second user device; and enabling the user to execute the user activity based on receiving a positive authentication response at the second device application of the second user device.

18. The computerized method of claim 17, wherein the situational event identified by the first robotic process automation application comprises at least one of occurrence of a natural disaster, breach of security of an entity, and a predetermined activity trend associated with the exposure event.

19. The computerized method of claim 17, wherein the method further comprises:
    determining whether current user security features meet the escalated authentication requirement for the user activity;
    determining one or more types of new security features that meet the escalated authentication requirement; and
    enabling the user to modify the current user security features based on the determined new security features.

20. The computerized method of claim 17, wherein configuring the first robotic process automation application for interacting with the first user interface of the first device application comprises configuring the first robotic process automation application to:
    identify a first input data portion to be provided at the first user interface of the first device application for identifying situational events;
    identify the input device of a plurality of input devices of the first user device that is associated with the first input data portion;
    identify an input signal format associated with the input device;
    transform the first input data portion into the input signal format associated with the input device; and
    transmit, to the first device application, input device control signals for the first input data in the input signal format.

* * * * *